Feb. 9, 1960 D. A. PAYNTER 2,924,744

DEFLECTION CIRCUIT

Filed Sept. 8, 1955

INVENTOR:
DONALD A. PAYNTER,

BY Donald N. Timbie

HIS ATTORNEY.

United States Patent Office 2,924,744
Patented Feb. 9, 1960

2,924,744

DEFLECTION CIRCUIT

Donald A. Paynter, Syracuse, N.Y., assignor to General Electric Company, a corporation of New York Application September 8, 1955, Serial No. 533,200
11 Claims. (Cl. 315—27)

This invention relates to an improved deflection circuit that uses a semiconductor device having an emitter, a collector and a base connection.

An object of the invention is to provide a deflection circuit that is more efficient.

It is another object of the invention to provide an improved deflection circuit that uses fewer component parts.

In deflection circuits employing vacuum tubes, one tube called a driver provides a deflection current through the yoke during one portion of the deflection cycle and another tube, called a damper, regulates the current flowing through the deflection yoke during another portion of the cycle.

In accordance with another feature of this invention, the current through the deflection yoke may be provided or regulated by a single semiconductor device.

The following cycle of operations exists in both the prior art deflection circuits as well as the one which is the subject of this invention. When there is no current in the deflection yoke, the beam is generally directed toward the center of the screen. The current through the yoke increases to a maximum value in one direction so as to shift the beam to one extreme position and then rapidly decreases through zero to a maximum value in the other direction. Then the current gradually decreases until a zero current condition is again obtained. The cycle of operation is then repeated.

In accordance with this invention, the current through the deflection yoke during the later portion of the deflection is provided by transistor action and is then abruptly cut off. The amount of energy stored in the magnetic field produced by the yoke is proportional to the square of the current so that it has a maximum value just before the current supply is cut off. The yoke and its associated circuitry form a resonant circuit which goes into oscillation when the current supply ceases. During the first half cycle of oscillation, the polarity of the voltage across the transistor output terminals is the same as before, but during the next half cycle of oscillation the polarity reverses. The circuit connections to the transistor are such that the reversal in polarity causes a reversal of the direction of current flow through the yoke and a portion of the transistor. Hence, the current in the yoke changes from a maximum value of one direction to a maximum value in the other and the electron beam is shifted from one extreme point of deflection to the other. If it were not for the damping provided by the current flow through a portion of the transistor, the yoke would continue to oscillate, but with the proper damping the current in the yoke gradually diminishes so that the beam is permitted to return at a uniform rate to the center of deflection. At this point transistor action is again resumed and the cycle of operation is repeated.

The manner in which the above objectives, advantages and features of this invention may be attained in accordance with the principles of this invention will be better understood after detailed consideration of the drawings in which.

Figure 1:
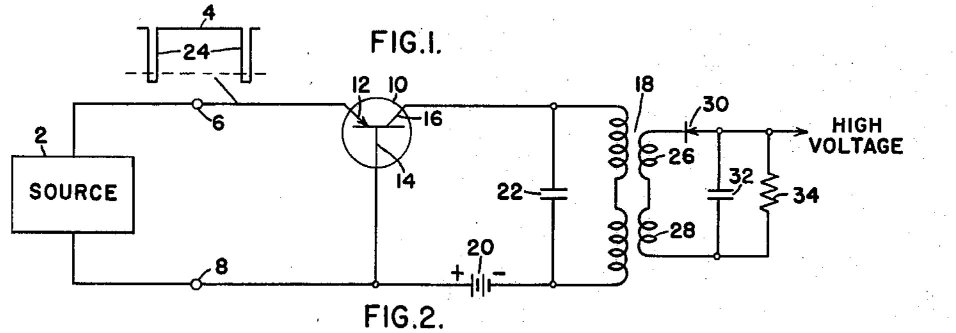
Figure 1 illustrates a deflection circuit embodying the principles of this invention wherein a P–N–P type of transistor is used in a grounded base configuration.

In Figure 1, a source 2 of current having voltage waves shaped such as indicated by the wave 4 is connected to terminals 6 and 8. A transistor 10, in this case a P–N–P type transistor, is arranged to have its emitter electrode 12 connected to the terminal 6, its base electrode 14 connected to the terminal 8 and its collector electrode 16 connected to the upper end of a deflection yoke 18. A positive terminal of a source of direct current voltage, here shown as a battery 20, is connected to the base electrode 14 and the negative terminal is connected to the lower end of the yoke 18. A capacitor 22 is connected in parallel with the yoke 18 and is of such value as to make the yoke 18 resonant at a frequency which has a half cycle duration equal to or less than the blanking period which, as will be explained hereinafter, lasts during the negative pulses 24 of the waveform 4. If the stray capacitance of the circuit in parallel with the yoke 18 is sufficient to produce such resonance, then the capacitor 22 may be omitted.

In many applications, it will not be desired that high voltage recovery be obtained from the circuit. However, if desired, high voltage may be obtained by providing coils 26 and 28, which are magnetically coupled to the yoke 18, and by rectifying, as by a diode 30, the voltage induced by the yoke 18 in the coils 26 and 28. A capacitor 32 and a resistor 34 are connected in parallel between the diode 30 and one end of the coil 28 so as to form a complete circuit and to filter out any undesired ripple. If need be, a transformer may serve to couple the output of the transistor device to the yoke and/or the high voltage recovering circuit.

Figure 2:
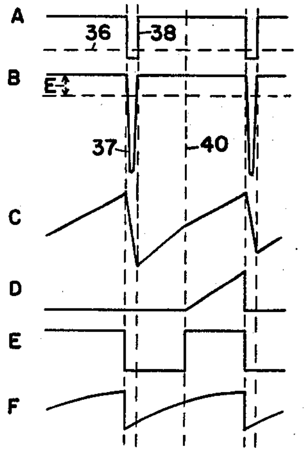
Figure 2 is comprised of a series of waveforms useful in explaining the operation of the various embodiments shown in the other figures of the drawings.

We turn now to the various waveforms shown in Figure 2 for an explanation of the operation of the circuit shown in Figure 1. The wave A of Figure 2 corresponds to the wave 4 of Figure 1 and, as will be recognized by those skilled in the art, the wave A represents the voltage of the terminal 6 with respect to the terminal 8. The dotted line 36 indicates the point at which the voltage applied to the emitter electrode 12 of Figure 1 cuts off the emitter current. As indicated by the wave B of Figure 2, the cutting off of the emitter current causes the yoke 18 to go into oscillation in such polarity as to make the upper end of the yoke negative. The oscillation is of such frequency that a half cycle 37 takes place during the negative pulse 38 of the wave A. After a quarter cycle of oscillation, the upper end of the yoke 18 starts in a positive direction and when it is sufficiently positive to make the collector electrode 16 positive with respect to the positive terminal of the battery 20, the collector electrode 16 and the base electrode 14 now act as a low resistance diode. Under this condition, collector current will flow regardless of the emitter bias as the collector 16 is now biased in the forward direction. The voltage drop across this diode, that is between the collector electrode 16 and the base electrode 14, is so small with respect to the voltage E of the battery 20 that the upper end of the yoke 18 may be considered to be practically connected to the positive terminal of the battery 20. If the resistance between the collector 16 and the base electrode 14 during this portion of the cycle were not so small, the voltage at the upper end of the yoke 18 would rise to a high positive value. As it is, however, the upper end of the yoke 18 is only slightly above the potential of the positive terminal of the battery 20, that is to say in the order of half of a volt. The current through the diode formed by the collector electrode 16 and the base electrode 14 is supplied by the decaying magnetic field of the yoke 18. At the approximate center of deflection, the rate of decay of the magnetic field of the yoke 18 is so small that the collector electrode 16 is no longer positive with respect to the base electrode 14. At this point the device 10 operates as a transistor and a low resistance connection is established between the collector 16 and the emitter 12. If the impedance of the source 2 is sufficiently low, the upper end of the yoke 18 is effectively connected to the positive terminal of the battery 20. Hence, the current through the yoke 18 now flows in the opposite direction. The rate of change of current through the yoke and, hence, the rate of deflection is substantially the same for both directions of current flow because, as is well known to those skilled in the art, the rate of change of the current times the inductance of the yoke equals the voltage across it and this voltage is the same as the voltage across the battery 20. During one portion of the deflection cycle, the current through the yoke 18 is supplied by its decaying magnetic field and the battery 20 acts as a regulator and during the other portion of the deflection cycle, the yoke current is supplied by the battery.

The variations in yoke current are shown in the waveform C. A dotted line 40 indicates the point at which the collector electrode 16 is no longer positive with respect to the base electrode 14. During the first half of the deflection cycle, i.e., to the left of the dotted line 40, the voltage produced by the decaying magnetic field of the yoke is, as previously mentioned, slightly greater than the voltage of the battery 20 so that the current through the yoke changes at a slightly greater rate than during the second half of the deflection cycle, i.e., to the right of the dotted line 40 when the voltage applied to the yoke must be slightly less than the voltage of the battery 20. This slight change in voltage in the waveform B and the slight change of current in the waveform C might at first be thought to indicate a marked degree of non-linearity. However, in practice these changes are so slight as to be hardly noticeable and are shown in the waveforms out of true proportion so that a better understanding of the operation may be obtained.

During the portion of the cycle to the left of the dotted line 40, the emitter 12 does not need to be operative as all the yoke current is being supplied by the decaying magnetic field and, therefore, no voltage need be applied to it. In order to conserve power which would otherwise be consumed between the emitter 12 and the base electrode 14, the voltage applied to the emitter may be as shown in the waveforms D, E or F of Figure 2.

However, during the portion of the cycle to the right of the dotted line 40, the semiconductor device operates as a transistor and it is desirable that the transistor be saturated in order that it form a low resistance connection between the upper end of the yoke 18 and the battery 20. Therefore, during this portion of the cycle the emitter 12 need only supply as many or more carriers than the collector 16 can absorb. Any carriers in excess of this amount flow to the base electrode 14 and cause needless internal losses. Maximum efficiency can be attained if the voltage wave supplied by the source 2 is as shown in the waveform D, as this will cause the transistor to operate at the point of saturation during the right hand portion of the cycle. The voltage supplied by the source 2 may also be shaped as shown in the waveform E and F. Whereas these latter wave forms may be somewhat less efficient from a power standpoint, they may be easier to obtain in a given environment.

Figure 3:
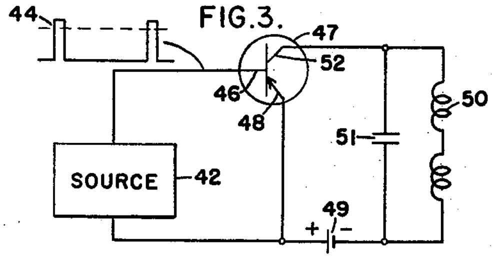
Figure 3 illustrates an embodiment of this invention wherein a P–N–P type of transistor is used in a grounded emitter configuration.

In Figure 3, a source 42 supplies a voltage or current wave 44 to a base electrode 46 of a semiconductor device 47. The other side of the source is connected to an emitter electrode 48. The upper end of a yoke 50 is connected to a collector electrode 52. The negative terminal of a battery 49, or other suitable source of fixed potential, is connected to the lower end of the yoke 50 and the positive terminal is connected to the collector electrode 48. If necessary, a capacitor 51 may be connected in parallel with the yoke 50. Those skilled in the art will recognize that in this embodiment of the invention the semiconductor device 47 is connected in a grounded emitter configuration and that its operation is similar to the operation of Figure 1, except that the current flowing as a result of the decay of the magnetic field of the yoke 50 now flows through the source 42, as well as between the collector electrode 52 and the base electrode 46. In Figure 1, only a small portion of this current flowed through the source 2. In Figure 3, however, the current flows through the source 42 when the current is supplied by the battery 49. Hence, it is desirable that the sources 2 and 42 have a low impedance for frequencies in the vicinity of the deflection frequency.

Figure 4:
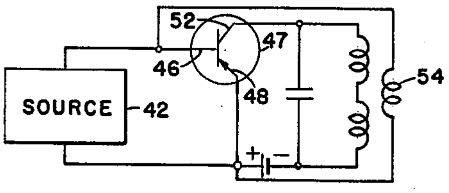
Figures 4 and 5 are similar to Figure 3 and illustrate different ways of overcoming any high impedance in the control sources.

The impedance of the sources 2 and 42 can be made low enough at the deflection frequencies by use of transformers or by use of circuits employing transistors. It is also possible to reduce the apparent impedance of these sources by coupling energy from the yokes to the emitter electrode 12 of Figure 1 or to the base electrode 46 of Figure 3. This may be done in various ways, but one way is illustrated in Figure 4 (Figure 4 being otherwise identical to Figure 3) wherein a winding 54 that is magnetically coupled to the yoke 50 is connected between the emitter electrode 48 and the base electrode 46. The winding sense of the winding 54 is such that the energy coupled to the base electrode 46 is regenerative.

Figure 5:
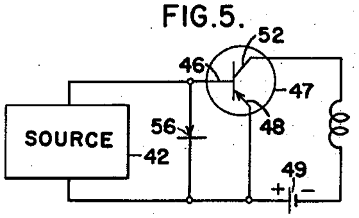

If for any reason it is not desired to use the above methods of making source 42 have an effective low impedance, the source may be shunted by a diode 56 as shown in Figure 5. Otherwise Figure 5 is identical to Figure 3. The current flowing as a result of the decay of the magnetic field of the yoke 50 flows through the diode formed by the collector electrode 52 and the base electrode 46 as well as through the diode 56.

It will be apparent to those skilled in the art that N–P–N type transistors could be substituted for the P–N–P transistors if the polarities of the voltage waves of the sources 2 and 42 and the batteries 20 and 49 are reversed and the diodes 30 and 56 are reversed.

While I have illustrated particular embodiments of my invention, it will of course be understood that I do not wish to be limited thereto, since various modifications, both in the circuit arrangement and in the instrumentalities, may be made and I contemplate by the appended claims to cover any such modifications as fall within the true spirit and scope of the invention.

What I claim as new and desire to secure by Letters Patent of the United States is:

1. A deflection circuit comprising a semiconductor device having an input electrode, an output electrode and a common electrode, a low impedance source of voltage waves coupled between said input electrode and said common electrode, the voltage wave of said source being of such nature as to substantially cut off the current flowing therebetween during periodically recurring intervals, a deflection yoke, means for applying a potential between said output electrode and said common electrode, the polarity of said source of fixed potential being such as to bias said output electrode in a back direction with respect to said common electrode, said output electrode and said common electrode being biased in a forward direction by a reversal of voltage appearing across said deflection yoke when said semiconductor device is cut off by said low impedance source of voltage waves.

2. The deflection circuit comprising in combination: a semi-conductor device having an emitter electrode, a base electrode, and a collector electrode; a deflection yoke; a source of fixed electromotive force; means for connecting said yoke and said source in series between said collector electrode and said base electrode so as to apply a fixed potential between said collector electrode and said base electrode, the polarity of said source being such as to bias said collector electrode in a back direction with respect to said base electrode; a control source connected between said emitter electrode and said base electrode, said control source being of such nature as to substantially prevent current flow between said emitter electrode and said base electrode during recurring relatively short intervals and to provide enough current from said emitter electrode to just saturate said collector electrode during approximately half of the time between said short intervals immediately preceding said intervals, said collector electrode and said base electrode being biased in a forward direction by a reversal of voltage appearing across said deflection yoke when said semi-conductor device is cut off by said control source.

3. A deflection circuit comprising in combination: a semi-conductor device having a base electrode, an emitter electrode, and a collector electrode; a deflection yoke; a source of bias potential, said source and said deflection yoke being connected in series between said collector electrode and said emitter electrode, said source of bias potential being polarized in a manner such as to bias said emitter electrode in a forward direction and said collector electrode in a back direction; and a low impedance control source, said control source being adapted to prevent any substantial amount of current from flowing from said emitter during relatively short intervals and to cause said emitter to just saturate said collector electrode for a pre-determined time before each of said intervals, said collector electrode being biased in a forward direction by a reversal of voltage appearing across said deflection yoke when said semi-conductor device is cut off by said low impedance control source.

4. A deflection circuit that is set forth in claim 3 in which a regenerative feed-back circuit is coupled between said collector electrode and said base electrode.

5. A deflection circuit comprising: a semi-conductor device having an input electrode, a common electrode, and an output electrode; a deflection yoke; a source of fixed electromotive force; leads for connecting said yoke and said source in series between said output and common electrodes; and a control source connected between said first and second electrodes for producing an output wave such that during a period of said wave, comprising three intervals of time, during a first interval, current flows from said source to said yoke through the path between said input electrode and output electrode, during the second portion no current flows in said semi-conductor device, and during the third portion current flows from said yoke through the path between said output electrode and said common electrode.

6. The deflection circuit of claim 5 wherein said control source has a low internal impedance.

7. The deflection circuit of claim 6 wherein said control source produces a voltage that is just sufficient to produce saturation between said input and output electrodes during said first interval of time and which at all other times produces a back bias voltage between said input and common electrode.

8. A deflection circuit comprising: a semi-conductor device having first, second, and third electrodes; a source of fixed voltage; a deflection yoke, leads for connecting said yoke and said source in series between said second and third electrodes; and a control source connected between said first and second electrodes for producing an output wave such that during a period of said wave comprising three intervals of time, during one interval current flows between the path between said first and third electrodes, during another interval of time current flows between said second and third electrodes, and during the third interval no current flows between any of said electrodes.

9. The deflection circuit of claim 8 wherein said control source has a low internal impedance.

10. The deflection circuit of claim 9 wherein said control source produces a voltage that is just sufficient to produce saturation between said first and third electrodes during said one interval and produces a back bias voltage at all other times.

11. A deflection circuit of claim 10 wherein said control source produces a voltage that is just sufficient to produce saturation between said second and third electrodes during said another interval and produces a back bias voltage at all other times.

References Cited in the file of this patent

UNITED STATES PATENTS

| | | |
|---|---|---|
| 2,728,857 | Sziklai | Dec. 27, 1955 |
| 2,728,876 | Varela | Dec. 27, 1955 |
| 2,747,136 | Herzog | May 22, 1956 |
| 2,760,109 | Shade | Aug. 21, 1956 |
| 2,794,076 | Shea | May 28, 1957 |
| 2,886,740 | Finkelstein | May 12, 1959 |

FOREIGN PATENTS

| | | |
|---|---|---|
| 1,086,824 | France | Aug. 18, 1954 |

OTHER REFERENCES

Sziklai, G. C.: "Transistor Circuits and Applications," Electronic Engineering, vol. 25, September 1953, page 361.

Lohman, Robert D.: "Complementary Symmetry-Transistor Circuits," Electronics, September 1953, page 143.

Herzog et al.: "Transistorized Portable Receiver," Radio-Electronics, January 1955, pages 43 to 45.